Nov. 17, 1970   A. KULLING ET AL   3,540,853
MEANS FOR PRODUCING TITANIUM DIOXIDE PIGMENT
Filed April 24, 1968   2 Sheets-Sheet 1

INVENTORS
Achim Kulling
Hans Steinbach
Hermann Trueb

BY  H. L. Gammons
AGENT

INVENTORS
Achim Kulling
Hans Steinbach
Hermann Trueb

BY H. L. Gammons

AGENT

United States Patent Office 3,540,853
Patented Nov. 17, 1970

3,540,853
MEANS FOR PRODUCING TITANIUM DIOXIDE PIGMENT
Achim Kulling, Opladen, Hans Steinbach, Bergisch Gladbach, and Hermann Trueb, Opladen, Germany, assignors to Titangesellschaft m.b.H., Leverkusen, Germany, a corporation of Germany
Filed Apr. 24, 1968, Ser. No. 723,700
Claims priority, application Germany, June 3, 1967, T 34,024
Int. Cl. C01g 23/04
U.S. Cl. 23—277         5 Claims

ABSTRACT OF THE DISCLOSURE

The present invention relates to a novel means for producing a rutile $TiO_2$ pigment by a vapor phase process wherein the heat required for the reaction of the gaseous $TiCl_4$ with oxygen is provided by a column of hot combustion gases which fills the entire cross-section of a pre-combustion chamber immediately preceding a feeding ring designed to introduce gaseous $TiCl_4$ into the column of hot gases from a multiplicity of radial apertures surrounding the column of hot combustion gases and lying in a common plane substantially at right angles to its longitudinal axis, the reaction of the $TiCl_4$ with the $O_2$ in said hot gases taking place within a relatively short reaction zone which begins at the $TiCl_4$ feeding ring thus insuring high reaction temperatures, short reaction time, uniform residence time and no reverse currents in the reaction zone.

BACKGROUND OF THE INVENTION

The field of invention would appear to be Class 23 Subclass 202 by U.S. Patent Office Classification.

The invention is concerned, in general, with a process for the manufacture of a rutile pigment by reaction of titanium tetrachloride with oxygen in the presence of hot combustion gases produced by combustion of carbon monoxide with oxygen the hot gases being brought into contact with the gaseous titanium tetrachloride and, as the case may be, with further oxygen, and mixed thoroughly whereby a reaction takes place with the formation of titanium dioxide. The reaction product gases containing the titanium dioxide produced by the reaction are subsequently cooled, whereupon the titanium dioxide is separated from these gases.

For the manufacture of a good rutile pigment it is necessary that the reacting gases be mixed thoroughly and rapidly and that the reaction take place at high temperatures. The procedure is, in general, such that the titanium dioxide formed is maintained initially at elevated temperature for sufficient time to achieve a transformation of the titanium dioxide from the anatase form first produced to the rutile form. However the residence time of the pigment in the zone of high temperature must not be too long because otherwise a particle size increase occurs which causes an impairment in pigment qualities. Also in order to promote rutile formation and/or obtain additional good pigmentary properties it is often the practice to add slight amounts of other substances, e.g. water, aluminum trichloride, silicon tetrachloride, zirconium tetrachloride, etc. to the reactants.

Furthermore, special precautions must be observed during the reaction in order to reduce formation of titanium dioxide deposits at the mouths of the gas inlet pipes and on the chamber walls; and any such deposits so formed must be removed since such deposits disturb the reaction and reduce the quality of the products obtained.

British patent application No. 1,010,061 describes a process in which the hot combustion gases produced by the combustion of carbon monoxide and oxygen, comprise a thin stream which is blown in centrally into a relatively wide reaction chamber, wherein shortly before entering the reaction chamber gaseous titanium tetrachloride is added to the hot gas mixture through separate supply pipes. Also a laminar current of gas is conducted along the chamber walls toward the exit of the chamber for its protection. This gas consists of a part of reaction product gas that has been produced in the reaction, freed of its titanium dioxide burden and preferably cooled.

In another process (Dutch patent application No. 298,872) carbon monoxide is burned in a precombustion chamber with oxygen to form hot combustion gases which are introduced into a relatively wide reaction chamber through a narrow pipe wherein at the point of introduction into the wide reaction chamber gaseous titanium tetrachloride is introduced together with a current of chlorine which is passed between the hot gases and the gaseous $TiCl_4$. Below the place where the reaction proper of titanium tetrachloride with oxygen begins, a cold inert gas may be introduced into the reaction chamber in order to cool down the reaction products stepwise.

According to the process described in the British patent application 1,047,713 oxygen is reacted with carbon monoxide in a pre-combustion chamber and the hot gas mixture produced thereby is conducted through a constriction into a relatively wide or widening reaction zone therein. Shortly after entering the reaction zone, a mixture of titanium tetrachloride and excess oxygen is introduced into the hot gas mixture.

Furthermore, a process has become known (South African patent application No. 2,153/66) in which hot gases formed by the combustion of a carbon compound in a pre-combustion chamber are introduced axially into a reaction chamber conically widened toward its outlet, while titanium tetrachloride is introduced into the reaction chamber via inlet pipes in the side thereof, wherein a cold inert gas may be introduced tangentially below the titanium tetrachloride inlet pipes for rinsing the wall of the chamber.

However all known processes have the disadvantage that the reaction of the titanium tetrachloride and oxygen takes place in a relatively long reaction chamber and moreover the reaction fills only a part of the reaction chamber cross-section, the effect of which is to produce reverse gas currents therein. Consequently the residence times of the individual titanium dioxide particles in the reaction chamber differ greatly; when the residence times are too short the conversion to rutile will not have been completed and the particle size is possibly too fine; while if the residence time is too long the product is overcalcined and its particle size is too coarse. Thus, the product is non-uniform and does not measure up to the high requirements which are demanded for a high quality rutile pigment in many fields of application.

Further, owing to the great length of these reaction chambers or the unsuitable shape of these chambers, considerable effort is required in order to keep the chamber walls free of deposits. The methods suggested for this purpose, in the processes of the prior art, are frequently unsatisfactory. The gas which is used in some cases as a protective film on the chamber wall is prone to mix easily with the reacting gases owing to unfavorable flow conditions and hence protection of the wall is unsatisfactory and impairment of the reaction occurs. Also the use of a finely divided inert solid substance to keep the reaction chamber wall free of deposits, for example, as described in the South African application No. 2,153/66, is unsatisfactory since, following the reaction, the solid inert material must be separated and removed from the titanium dioxide.

SUMMARY OF THE INVENTION

The present invention overcomes the disadvantages attending the methods of the prior art. In general a pyrogenic rutile titanium dioxide pigment is produced by the reaction of gaseous $TiCl_4$ with the oxygen in a column of hot combustion gases produced by separate combustion of carbon monoxide and an excess of oxygen or a gas containing oxygen, the gaseous $TiCl_4$ being introduced into the column of hot combustion gases from a ring of radial jets in a common plane at substantially right angles to the longitudinal axis of the column of hot gases and in a manner such that the reaction takes place in a reaction zone of relatively short length and over substantially the entire cross section thereof. This has been accomplished by designing a reactor with a cylindrical precombustion chamber, succeeded by a $TiCl_4$ feeding ring having an inner diameter substantially equal to the inner diameter of the precombustion chamber; a relatively short cylindrical reaction chamber below the $TiCl_4$ feeding ring, and a burner manifold at the entrance end of said precombustion chamber having burners designed to produce a column of hot combustion gases which, in passing from the precombustion chamber into the reaction chamber, fills the entire cross sectional area of the $TiCl_4$ feeding ring; the gaseous $TiCl_4$ being adapted to issue from a multiplicity of radial jet apertures in the inner wall of the $TiCl_4$ feeding ring surrounding the column of hot gases and to penetrate the latter in a manner such that the reaction of the $TiCl_4$ with the oxygen in the hot combustion gases takes place over substantially the entire cross sectional area thereof. The reaction of the $TiCl_4$ and oxygen is thus initiated within the $TiCl_4$ feeding ring and, as hereinafter disclosed, is fully completed within the length of the reaction chamber, the space so defined being referred to hereinafter as the reaction zone.

In this connection the exit velocity of the radial $TiCl_4$ jets is selected on the bases of the cross-sectional area of the reaction zone, as measured by the inner diameter of the reaction chamber, and the velocity of the hot combustion gases such that the $TiCl_4$ jets penetrate the column of hot gases far enough to maintain the reaction over the entire area of the $TiCl_4$ feeding ring but not so far as to strike the opposite walls thereof or of the reaction chamber. To meet these conditions the throughput of gaseous $TiCl_4$ has been determined to be from 5000 to 40,000 kg./hr. per sq. m. of reaction zone cross section. The invention also features the use of two rinsing gas feeding rings, one assembled between the exit end of a precombustion chamber and the $TiCl_4$ feeding ring, and the other between the latter and the entrance end of a reaction chamber. The former rinsing gas feeding ring has an inner diameter equal to the inner diameter of the precombustion chamber while the latter feeding ring has an inner diameter equal to that of the reaction chamber, the inner diameter of which is slightly larger than that of the $TiCl_4$ feeding ring and precombustion chamber.

The first rinsing gas feeding ring is adapted to provide a protective layer of cool gas at the $TiCl_4$ jet apertures to prevent $TiO_2$ from depositing thereon; and to counteract any counterflow of the reactant gases into the precombustion chamber. The second rinsing gas feeding ring is adapted to provide a film of cool gas on the wall of the reaction chamber to protect it from the hot gases and to prevent deposits of $TiO_2$ from forming thereon.

With a reactor of this design and operated as described above the reaction of the gaseous $TiCl_4$ with the oxygen in the column of hot combustion gases is made to take place over the entire area of the reaction zone which is relatively short in length as a consequence of which the temperature in the reaction zone is uniformly high, the gaseous $TiCl_4$ is reacted in a relatively short time, the residence time of the $TiO_2$ particles in the reaction zone is uniform and there is no reverse currents or $TiO_2$ deposits to interfere with the reaction.

DESCRIPTION OF PREFERRED EMBODIMENT

Figure 1:
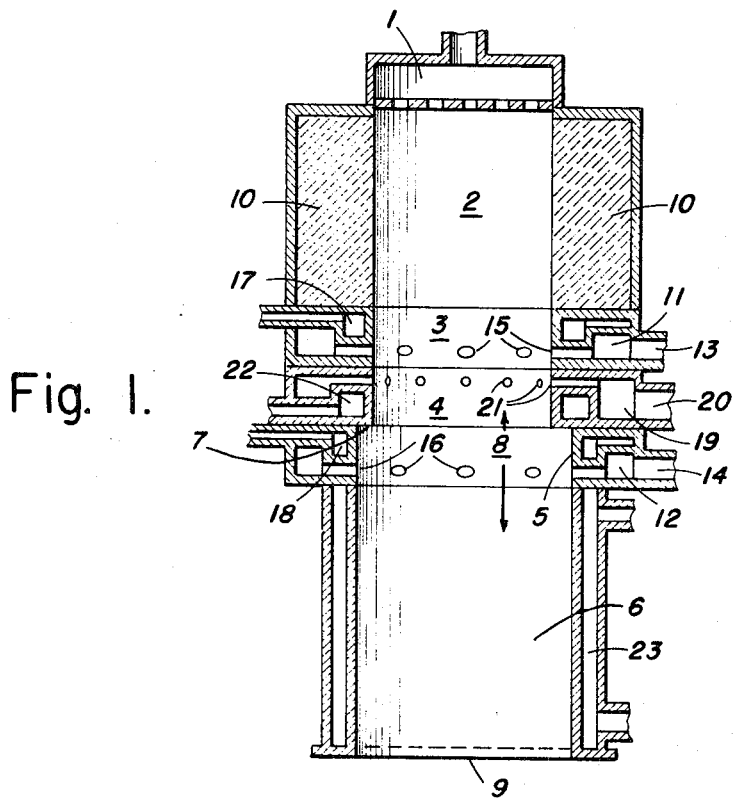
FIG. 1 is a vertical elevation in section of the reactor of this invention comprising, in integral superposed relationship, a burner manifold, a precombustion chamber, an upper gas feeding ring, a $TiCl_4$ feeding ring, a lower gas feeding ring and a reaction chamber.

Before describing the structural details of the reactor shown in the drawings it should be emphasized that in its preferred embodiment the process of the invention is characterized in that the column of hot combustion gases in the cylindrical precombustion chamber is produced with the aid of a burner manifold having multiple burners which provide uniform admission of the hot reacting gases into the precombustion chamber where the reaction of the gases is completed, the resulting hot combustion gases filling the entire cross section of the precombustion chamber and forming, in effect, a solid column of hot combustion gases which passes through the $TiCl_4$ feed ring into the cylindrical reaction chamber arranged in axial alignment therewith. The unmixed gaseous titanium tetrachloride is blown into the column of hot combustion gases radially from a plurality of jet apertures located in a common plane at right angles to the longitudinal axis of the column of hot gases and distributed around the entire circumference thereof wherein the throughput of titanium tetrachloride divided by the cross-section of the reaction zone is from 5000 to 40,000 kg./hr. sq. m. Directly above and below the titanium tetrachloride jet openings rinsing gases are introduced tangentially into the precombustion chamber and reaction zone by means of upper and lower gas feeding rings respectively. In this connection the inner diameter of that portion of the reaction zone defined by the lower rinsing gas feeding ring and the upper portion of the reaction chamber is slightly larger than the inner diameter of the $TiCl_4$ feeding ring so as to provide an annular step or shoulder as and for the purpose hereinafter described.

According to the process of the invention the production of the column of hot combustion gases and the reaction of the gaseous titanium tetrachloride therewith are carried out spatially separately and consecutively in a cylindrical space of practically constant diameter with smooth walls and without built-in parts. Using this geometric construction combined with a high throughput of gaseous $TiCl_4$ per unit of cross-sectional area, the conditions for clean-cut flow without back-currents are met. The hot combustion gases are the product of an auxiliary flame produced by combustion of CO and $O_2$ in the burners of the burner manifold and fill the entire cross-section of the precombustion chamber uniformly, the column of hot gases being pushed downwardly by the succeeding gases and having, at all points of its cross-section essentially the same velocity and temperature. The gaseous titanium tetrachloride is divided into many small jets and blown radially into the column of hot gases. By this means a fine and intensive distribution of the titanium tetrachloride in the hot combustion gases is achieved in consequence of which the reaction takes place uniformly over substantially the entire cross-section of the reaction zone and extends longitudinally only a relatively short distance. This reaction zone is very hot so that the titanium tetrachloride is reacted in a very short time. Moreover while some minute gas turbulence may be present no reverse gas currents appear. The residence time of the individual titanium dioxide particles in the reaction zone is thus of uniform duration and for that reason a uniform pigment particle size with good properties is obtained.

A decisive advantage of the process according to the invention is the fact that the reaction occurs fast and over a short distance. The maintenance of uniform temperature and retention times for all titanium dioxide particles is strongly favored thereby. In addition, a relatively short reaction zone results which facilitates freeing the chamber wall from deposits and only a small amount of rinsing gas is needed for this purpose. It is possible at a throughput of 500 kg./hr. titanium tetrachloride to achieve complete reaction in a reaction zone of from 150 to 200 mm. length.

The length of the reaction zone and the duration of the reaction and, therefore, uniformity of pigment particles size depend essentially on the rapid and uniform mixing of the titanium tetrachloride with the oxygen in the column of hot combustion gases over the entire cross-section of the reaction zone. For this purpose the subdivision of the gaseous titanium tetrachloride into a fairly large number of titanium tetrachloride jets is necessary since the subdivision into a few jets only results in non-uniform mixing. To this end the cross-section and the exit velocity of each individual titanium tetrachloride jet must be adjusted to the cross-section of the reaction zone and the velocity of the hot combustion gases in such a way that the titanium tetrachloride jets penetrate the column of hot gases sufficiently but not too much. If they penetrate the hot combustion gases too little a relatively long mixing zone results and a non-uniform mixing occurs. If they penetrate too far, pigment deposits are formed on the opposite wall of the $TiCl_4$ feeding ring portion of the reaction zone. In order to meet this condition the titanium tetrachloride throughput divided by the reaction zone cross-section should amount to 5000 to 40,000 kg./hr. sq. m. In this connection it is also advantageous to inject the gaseous titanium tetrachloride in at an initial impulse per titanium tetrachloride jet divided by the reaction chamber diameter of 0.02–0.6 kg./m.

Concerning the hot combustion gases in the precombustion chamber, these gases should have a certain fine turbulence without that regressive currents occur, and in addition, the temperature as well as velocity of the gas mixture should be as uniform as possible over the entire cross-section of the precombustion chamber. For these purposes it is expedient to divide the oxygen or the gas containing oxygen and the carbon monoxide, either mixed or separated, into separate streams and feed them to a plurality of individual burners of a burner manifold superposed on said precombustion chamber, the individual burners being, if desired, regulated separately for the control of the gas flow. For example, the individual burners may be charged at different rates. It may also be of advantage to give both gases, in each individual burner, a counter-current spin which may be accomplished by suitable inserts. Further in order to maintain the desired velocity and temperature distribution of the hot gases up to the point where it is reacted with the titanium tetrachloride, it is advantageous not to have the precombustion chamber too long and to have it insulated against heat losses, as the case may be.

The length of the reaction zone measured within the distance between the $TiCl_4$ feeding ring and the bottom edge of the reaction chamber may be varied within certain limits, whereby the pigment characteristics are modified. With a short reaction zone the pigments obtained are of fine particle size; while with longer reaction zones the pigment particles are coarser. Good pigments are obtained when the length of the reaction chamber, as measured from the $TiCl_4$ feed ring to the bottom edge of the reaction chamber, is 0.5–3 times the diameter of the latter.

A further advantage of the invention is seen in the fact that a rutile pigment is obtained, a pigment which along with other good properties does not contain any detectable amounts of anatase, i.e. less than 0.3% anatase. On the other hand, if a small amount of anatase is not troublesome, lesser amounts of addition agents will be required which leads, among other things, to savings in aluminum trichloride.

The rinsing gas of the upper rinsing gas feed ring fulfills two essential functions namely, it forms a protective gas layer at the jet apertures of the titanium tetrachloride feeding ring so that no $TiO_2$ deposits can be formed there. Also it counteracts any counter-flow of the $TiO_2$ and $TiCl_4$ burdened reacting gases back up into the precombustion chamber. In this connection the impulse of the upper rinsing gas must be adjusted to the impulse of the jet streams of titanium tetrachloride. If the impulse of the rinsing gas is too low, then titanium dioxide deposits may be formed at the lower end of the precombustion chamber whereby the reaction is badly hampered. On the other hand if the impulse of the rinsing gas is too strong, then the titanium tetrachloride streams that normally must penetrate the rinsing gas film in order to come into contact with the column of hot gases are carried along by the rinsing gas film and the reaction will be incomplete.

The rinsing gas of the lower rinsing gas feeding ring also has two functions namely, it protects the wall of the reaction zone against the hot reacting gases; and prevents the formation of titanium dioxide deposits on the walls of the reaction zone. It is essential that this rinsing gas form a stable gas film or layer on these walls that does not mix to any extent with the reacting gases. For this reason the rinsing gas must be introduced under very definite flow conditions. It must have a certain minimum linear velocity at the inlets, and the rinsing gas throughput per sq. m. of wall surface must not fall below a certain figure; the same is true for the product of introductory velocity and the rinsing gas throughput per sq. m. of coated wall surface. Furthermore, the rinsing gas must have a considerably lower temperature than the reacting gases. In order to support the effect of the rinsing gas film the walls of the reaction chamber may be cooled additionally from the outside. The conditions mentioned above are explained in more detail in the German patent application T–29994 IVa/12 n- T–650, and corresponding to U.S. application Ser. No. 585,064, filed Oct. 7, 1966, and now issued as U.S. Pat. No. 3,416,892.

It is also important to the production of a high quality rutile pigment that the portion of the reaction zone directly below the titanium tetrachloride feeding ring has a slightly larger inner diameter than the inner diameter of the $TiCl_4$ feeding ring so as to form an annular lip or step. This step permits the lower rinsing gas film to flow downwardly only. In general, the width of the annular step is ca. 1–2 cm.

The titanium tetrachloride jet inlets are designed in such a way that the gaseous titanium tetrachloride will enter into the column of hot combustion gases radially and in a common plane substantially at right angles to the longitudinal axis of the pre-combustion chamber—although slight deviations from this angle are possible. The size of the cross-section of the individual jet inlets depends on the titanium tetrachloride throughput, the number of jet inlets and the impulse with which the titanium tetrachloride jets enter the reaction zone. Also the jet inlets may be of different shape in cross section for example, circular, rectangular or slot-like for it has been found that the shape of the inlets exert a certain influence on the mixing of the titanium tetrachloride with the hot combustion gases. Moreover the cross-sectional area of the individual titanium tetrachloride jet inlets should not be smaller, in general, than 3 sq. mm. since otherwise clogging may occur; and the inlets may all have the same cross-section. However when using a reaction zone of relative large diameter it is advantageous to use jet inlets of varying shape and/or size. By this expedient the individual titanium tetrachloride vapor jets are projected at various distances into the column of hot gases whereby a particularly good and uniform mixing of the titanium tetrachloride with the hot gases takes place over the entire reaction zone cross-section.

It is generally favorable to use oxygen in excess of the amount necessary for the combustion of the carbon monoxide as well as for the reaction of the titanium tetrachloride; and the temperature of the hot combustion gases may be above 2000° C. Also the titanium tetrachloride is introduced in gaseous form and to this end preheating of the titanium tetrachloride above its boiling point is possible.

Although it is preferable to add all of the excess oxygen with the carbon monoxide through the multiple burner arrangement it is sometimes advantageous to introduce a part of the oxygen necessary for the titanium tetrachloride reaction into the precombustion chamber with the upper rinsing gas. In this case a higher temperature is reached in the hot gas mixture; besides that, a smaller amount of inert gas is required for the upper rinsing gas. However when adding oxygen to the upper rinsing gas, it must be kept at a very low temperature when entering the chamber, preferably room temperature for otherwise, a premature reaction between rinsing gas and titanium tetrachloride may take place and $TiO_2$ deposits formed on the chamber wall.

As rinsing gases the same gas or different gases may be used in both the upper and lower feeding rings. For example, nitrogen, chlorine, oxygen, air or mixtures of such gases are suitable. Particularly suitable is a reaction product gas cooled and freed from titanium dioxide.

It is often expedient to cool the $TiCl_4$ inlet apertures, the rinsing gas apertures and the multiple burner apertures of the burner manifold. The cooling may be done by a gas or a liquid.

Referring now to the drawings: FIG. 1 shows in cross-section, a reactor for carrying out the process according to the invention. The top of the reactor comprises a burner manifold characterized by a plenum chamber 1 having multiple flame apertures or burners. To the burner manifold are attached, in succession, a cylindrical precombustion chamber 2, an upper feeding ring 3 for the introduction of a rinsing gas into the precombustion chamber and a ring 4 for the introduction of gaseous titanium tetrachloride into the reaction zone delineated by arrows 8, the inner diameters of the precombustion chamber and the $TiCl_4$ feeding ring being equal. Another feeding ring is indicated at 5 for the introduction of a rinsing gas into the reaction chamber 6. Both the rinsing gas feeding ring 5 and the reaction chamber 6 are of equal inner diameter which is slightly greater than that of the $TiCl_4$ feeding ring 4 so as to form an annular step 7. At the lower end of the reaction chamber 6 is a discharge opening 9. The precombustion chamber 2 is provided with insulation 10. The feeding rings 3 and 5 for rinsing gas each have a ring-shaped channel 11 and 12 respectively. From the channels 11 and 12 the rinsing gas is projected via tangential bore holes 15 and 16 into the precombustion chamber and reaction zone respectively. Furthermore, each feeding ring is provided with cooling means 17 and 18 respectively.

The feeding ring 4 for the gaseous titanium tetrachloride has a ring-shaped channel 19 into which gaseous titanium tetrachloride is introduced via inlet 20. A multiplicity of radial jet apertures 21 serve to emit jet streams of the gaseous $TiCl_4$ into the upper end of the reaction zone. Furthermore, the $TiCl_4$ feed ring 4 is provided with cooling means 22. The reaction chamber 6 is jacketed as indicated at 23 for exterior cooling.

Figure 3:
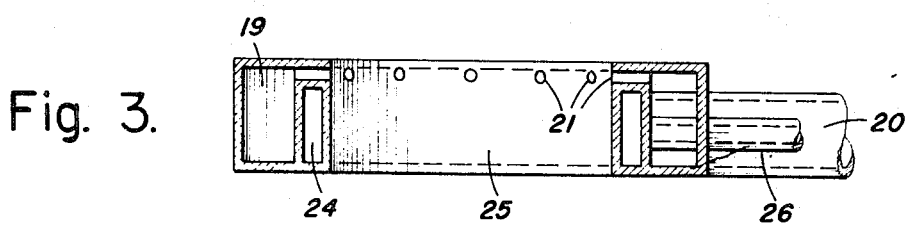
FIG. 3 is an elevation in section of the $TiCl_4$ feeding ring on line 3—3 of FIG. 2.
Figure 2:
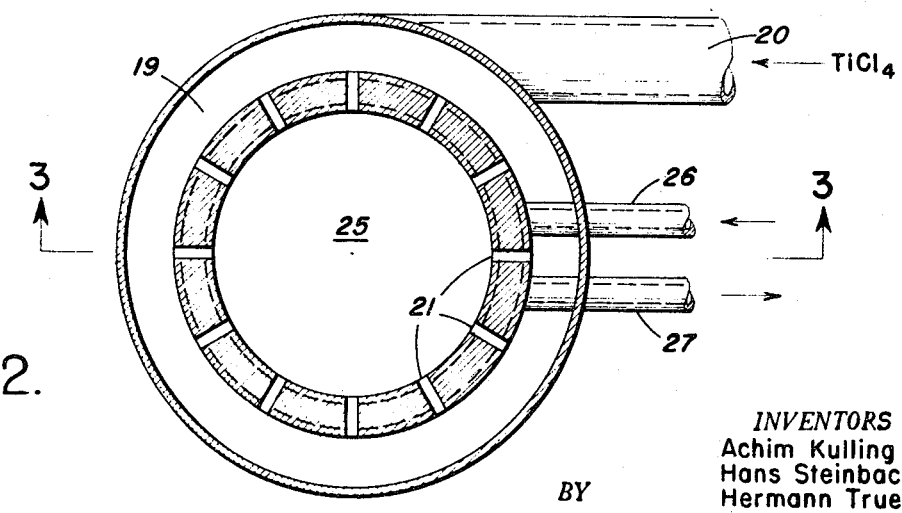
FIG. 2 is an enlarged plan view of the $TiCl_4$ feeding ring of FIG. 1.

Referring more especially to FIGS. 2 and 3 the $TiCl_4$ feeding ring has two concentric channels 19 and 24. The outer channel 19 has an inlet 20 for gaseous titanium tetrachloride and a multiplicity of radial jet apertures or inlets 21 in its inner wall for emitting streams of gaseous $TiCl_4$ into the center 25 of the reaction zone. The inner channel 24 is disposed in a plane below the jet inlets 21 and serves for circulating a coolant through the feeding ring, the pipes 26 and 27 serving for the introduction and discharge of the coolant.

In the feeding ring shown in FIGS. 2 and 3 the cross-section of the jet apertures 21 may be of different size and/or different form, and in each case it is expedient that jet apertures with different cross-sections be adjacent.

Figure 4:
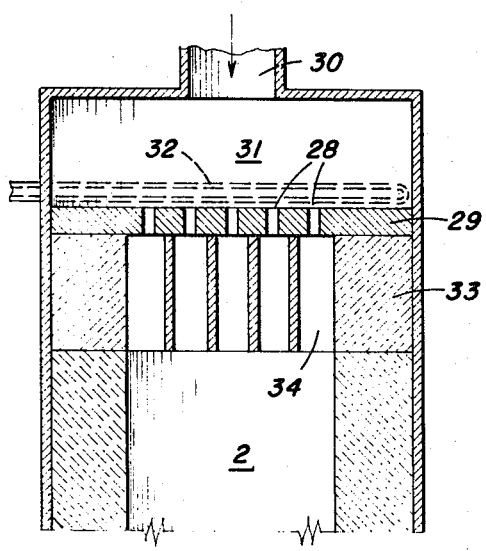
FIG. 4 is an enlarged fragmentary elevation in section of the precombustion chamber showing a modified form of burner manifold superposed thereon.

FIG. 4 shows a modification of the burner manifold. It consists of a plenum chamber 31 one wall of which comprises a plate 29 having a plurality of holes 28 entering from the plenum chamber into the precombustion chamber; and an inlet 30 for introducing a mixture of carbon monoxide and oxygen into the plenum chamber. In this respect the burner manifold is similar to that shown in FIG. 1. Referring again to FIG. 4, mounted on the upper side of the perforated plate 29 is a cooling pipe 32 for cooling the apertured plate, and below the plate 29 is a second thicker plate 33 having a plurality of holes 34. The holes 34 are of larger diameter than the holes 28 in the plate and run coaxially with these. Below the plate 33 is the precombustion chamber 2. The mixture of carbon monoxide and oxygen enters the duct 30 into plenum chamber 31 and flows from thence through the narrow holes 28 into the wider holes 34. The combustion of the gas mixture takes place within the wider holes 34. Thus back-firing of the flames is prevented by the fact that the gas mixture flows at high speed through the narrow and cooled holes 28.

Figure 5:
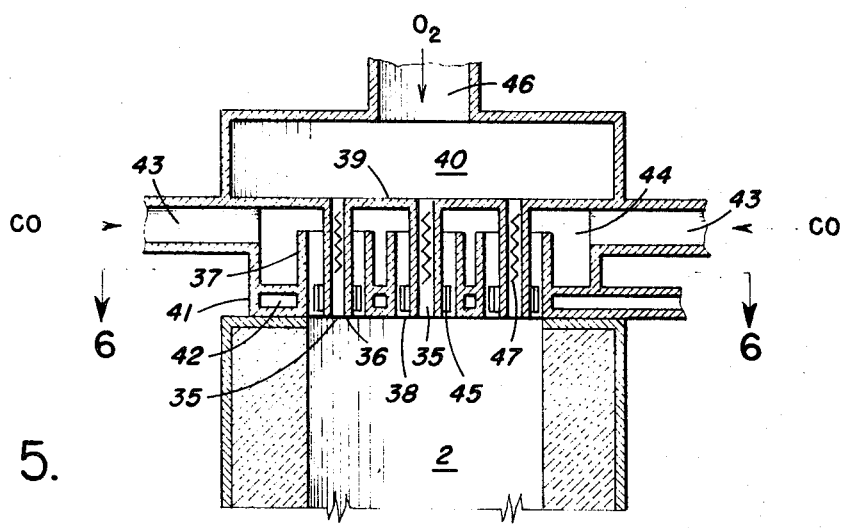
FIG. 5 is an elevation in section of another modified form of burner manifold used with the reactor of this invention.
Figure 6:
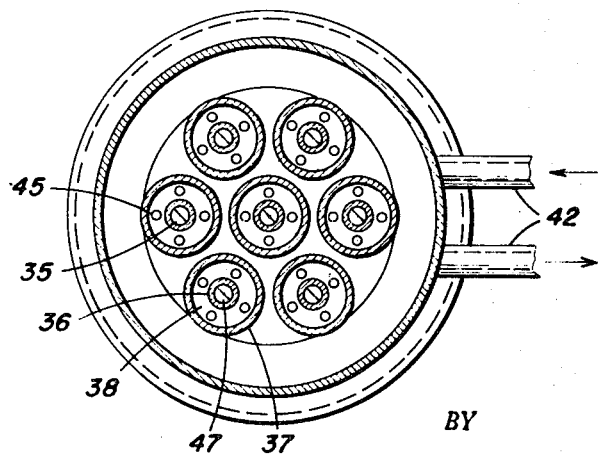
FIG. 6 is a plan view in section of the modified burner manifold of FIG. 5 on line 6—6 showing details of the individual burners.

Still another suitable type of burner manifold is shown in FIGS. 5 and 6. In this type of burner manifold the carbon monoxide and oxygen are introduced separately into a number of individual burners 35. Each individual burner consists of two concentrically arranged open-ended tubes 36 and 37 the tubes 36 projecting downwardly from the bottom plate 39 of the plenum chamber 40 and the tubes 37 projecting upwardly from a plate 41 which forms the upper closure of the precombustion chamber 2 and is cooled by a cooling agent flowing through a system of channels 42 therein. With this arrangement each set of concentric tubes 36 and 37 defines an annular slot or opening 38 communicating with the chamber 44 and the precombustion chamber 2. Chamber 44 is also provided with ducts 43 through which carbon monoxide passes into the chamber 44. Also each annular slot 38 is shown provided with suitable blades 45 whereby the CO gas is given a spin as it passes through the slots. The oxygen is introduced through duct 46 of the burner manifold into its plenum chamber 40 and from thence passes through the tubes 36 into the precombustion chamber 2. The tubes 36 are also provided with suitable builtin blades 47 whereby the oxygen receives a spin which is in the opposite direction to that of the carbon monoxide. In this way an intensive mixing of the two gases takes place immediately after their entrance into the precombustion chamber and the mixture burns to form hot combustion gases which fill the entire cross-section of the precombustion chamber uniformly.

The individual parts of the device may consist of metal or ceramic materials.

The following examples explain the invention in more detail. The anatase content of the pigments produced was determined by X-ray. For testing the pigment particle size the undertone in a gray paste was determined according to a test method described by P. B. Mitton and A. E. Jacobsen in "Official Digest" July 1962, pp. 704–715. High values indicate fine pigment particle size while low values indicate a coarser pigment size.

EXAMPLE 1

A reactor according to FIG. 1 was employed using the water-cooled burner manifold shown in FIG. 4 having 48 burner apertures 28 and 34 respectively.

The precombustion chamber 2 was lined with a refractory mass; it had a length of 100 mm. and an inner diameter of 180 mm. The feeding rings 3, 4 and 5 consisted of V₂A stainless steel and each of rings 3 and 4 had an inner diameter of 180, while ring 5 and reaction chamber 6 had an inner diameter of 200 mm. so that the reaction zone had an annular step 7 10 mm. wide. The feeding rings 3 and 5 were cooled with water and had four tangential apertures 15 and four tangential apertures 16 respectively each aperture having a cross-section area of 78.5 sq. mm. The reaction chamber 6 consisted of aluminum, had an inner diameter of 200 mm. and was cooled with water. The reaction zone 8 had a length of 150 mm.

The feeding ring 4 for the introduction of gaseous titanium tetrachloride was constructed as shown in FIGS. 2 and 3. It was 60 mm. high and was air cooled. Forty radial disposed jet apertures 24 mm. long led from the ring channel 19 through the inner wall of the ring each aperture having a cross-section of 36 sq. mm.

120 standard cu. m. per hr. of a carbon monoxide-oxygen mixture at room temperature, which consisted of 33% by volume of carbon monoxide and 67% by volume of oxygen, were introduced into the plenum chamber 31 of the burner manifold and burned to produce hot combustion gases in the precombustion chamber 2. 50 standard cu. m. per hr. of a gas mixture at room temperature, consisting of 50% by volume of oxygen and 50% by volume of reaction product gas divested of $TiO_2$ were introduced into the precombustion chamber through the rinsing gas feeding ring 3. Also through rinsing gas feeding ring 5 40 standard cu. m. per hr. reaction product gas divested of $TiO_2$ and cooled to room temperature were introduced into the reaction zone. Through the jet apertures 21 of feeding ring 4 500 kg. per hr. titanium tetrachloride at a temperature of 350° C. were injected into the reaction zone; prior to its addition aluminum trichloride in an amount of 2%, calculated as $Al_2O_3$ and on the basis of pigment, was added to the titanium tetrachloride.

The quotient of titanium tetrachloride throughput and reaction zone cross-section was 15800 kg. per hr. sq. m. and the ratio of the length of the reaction zone to its diameter 0.75. A very good rutile pigment with an undertone value of +4.1 was obtained; no anatase could be detected in the pigment (limit of detection 0.2% anatase).

EXAMPLE 2

A reactor such as shown in FIG. 1 was employed, wherein a burner manifold of the type disclosed in FIGS. 5 and 6 was used. The burner manifold had seven individual burners 35 and was water-cooled. The precombustion chamber 2 was lined with a refractory and had a length of 300 mm. and an inner diameter of 180 mm.

The feeding rings 3, 4 and 5 were made of nickel, each of rings 3 and 4 having an inner diameter of 180 mm. and ring 5 an inner diameter of 200 mm. so that the reaction zone had an annular step 7 10 mm. wide. The water-cooled reaction chamber 6 was made of aluminum, had a length of 300 mm., and inner diameter of 200 mm. and abutted the feeding ring 5. The feeding rings 3 and 5 for rinsing gas and the feed ring 4 for titanium tetrachloride were constructed as described in Example 1. The reaction zone 8 had a length of 350 mm.

Using this multiple burner arrangement 40 standard cu. m. per hr. carbon monoxide at room temperature and 70 standard cu. m. per hr. of oxygen preheated to 200° C. were introduced separately into the burner manifold and burned to produce hot combustion gases in the precombustion chamber 2. Through the feeding ring 3 60 standard cu. m. per hr. of a gas mixture were introduced into the precombustion chamber at room temperature, which mixture consisted of 50% by volume of reaction product gas divested of titanium dioxide and 50% by volume of oxygen. Through feeding ring 5 50 standard cu. m. per hr. reaction product gas divested of titanium dioxide and cooled at room temperature were introduced into the reaction zone.

Through the jet apertures 21 of the $TiCl_4$ feeding ring 4 500 kg. per hr. titanium tetrachloride were injected into the reaction zone as in the previous example, at 350° C. to which, 2.0% aluminum trichloride, calculated as $Al_2O_3$ on a pigment basis had been added.

The quotient of titanium tetrachloride throughput and reaction zone cross-section was 15,800 kg. per hr. per sq. m. and the ratio of the length of the reaction zone to its diameter was 1.75. A good rutile pigment having an undertone value of +3.0 was obtained; this time also no anatase was detectable.

EXAMPLE 3

The same reactor as in Example 2 was employed. 40 standard cu. m. per hr. carbon monoxide and 100 standard cu. m. per hr. oxygen preheated to 200° C. were introduced into the burner manifold and burned to form hot combustion gases in the precombustion chamber. 40 standard cu. m. per hr. reaction product gas freed of $TiO_2$ and cooled to room temperature were introduced into the precombustion chamber through feeding ring 3. The addition of titanium tetrachloride through feeding ring 4 and rinsing gas through feeding ring 5 was carried out as in Example 2.

A rutile pigment identical to that in Example 2 was obtained.

EXAMPLE 4

The same reactor as in Example 2 was employed except that the reaction zone was 550 mm. long. The process was carried out as in Example 2 with the only difference being that the volume of rinsing gas added through the feeding ring 5 was increased to 70 standard cu. m. per hr. The quotient of titanium tetrachloride throughput and reaction zone cross-section was 15,800 kg. per hr. per sq. m. and the ratio of the length of the reaction zone to its diameter was 2.75. A good rutile pigment with the undertone value of +1.5 was obtained; anatase was not detectable.

While this invention has been described and illustrated by the examples shown, it is not intended to be strictly limited thereto, and other variations and modifications may be employed within the scope of the following claims.

We claim:

1. A reactor for producing a rutile $TiO_2$ pigment by reacting gaseous $TiCl_4$ with hot combustion gases containing oxygen said reactor comprising: an elongated cylindrical precombustion chamber, a burner manifold superposed on said precombustion chamber and having multiple flame apertures arranged in its underside over substantially the entire area thereof thereby to inject hot combustion gases into said elongated cylindrical precombustion chamber over the entire cross sectional area thereof, a circular $TiCl_4$ feeding ring arranged in axial alignment with said precombustion chamber, said feeding-ring having an inner diameter substantially equal to that of said precombustion chamber and a multiplicity of radial apertures arranged in the inner wall of said feeding-ring for issuing gaseous $TiCl_4$ from said ring in a common plane at right angles to the longitudinal axis of said precombustion chamber, an elongated cylindrical reaction chamber arranged below and in axial alignment with said $TiCl_4$ feeding-ring said reaction chamber comprising a reaction zone wherein the ratio of the overall length of the reaction zone to its inner diameter is from 0.5:1 to 3.0:1, an upper rinsing-gas feeding ring mounted on the upper face of said $TiCl_4$ feed ring between it and the lower end of said elongated precombustion chamber, and a lower rinsing-gas feeding ring supported on the upper end of said elongated cylindrical reaction chamber between it and the underside of said $TiCl_4$ feeding ring, the inner diameter of said lower rising-gas feeding ring and said reaction chamber being equal and greater than the inner diameter of said $TiCl_4$ feeding ring to form an annular shoulder therewith.

2. A reactor for producing a rutile $TiO_2$ pigment according to claim 1 wherein each of said upper and lower gas feeding rings has a multiplicity of apertures spaced circumferentially around its inner wall said apertures being arranged to feed a rinsing gas tangentially into said precombustion chamber and said reaction chamber respectively.

3. A reactor for producing a rutile $TiO_2$ pigment according to claim 2 wherein the area of each radial aperture in the titanium tetrachloride feeding-ring is at least 3 sq. mm.

4. A reactor for producing a rutile $TiO_2$ pigment according to claim 2 wherein said burner-manifold has a plurality of individual gas burners arranged to inject hot combustion gases into said cylindrical precombustion chamber over the entire cross-sectional area thereof.

5. A reactor for producing a rutile $TiO_2$ pigment according to claim 4 wherein the gas passages of said individual burners are constructed and arranged to impart a counter-current spin to the gases entering said precombustion chamber.

References Cited
UNITED STATES PATENTS

| | | | |
|---|---|---|---|
| 3,176,046 | 3/1965 | Kondo et al. | 23—277 XR |
| 3,403,001 | 9/1968 | Mas et al. | 23—277 XR |

JAMES H. TAYMAN, JR., Primary Examiner

U.S. Cl. X.R.

23—202, 284; 431—174, 185, 190; 106—300